United States Patent [19]

Hughes

[11] Patent Number: 4,576,627

[45] Date of Patent: Mar. 18, 1986

[54] METHOD OF PROVIDING FERTILIZER FROM BRINES

[76] Inventor: William B. Hughes, 6605 Bob-O-Link Dr., Dallas, Tex. 75214

[21] Appl. No.: 647,085

[22] Filed: Sep. 4, 1984

[51] Int. Cl.⁴ ............................................. C05B 11/10
[52] U.S. Cl. ......................................... 71/41; 71/43; 71/33; 423/306
[58] Field of Search .................... 71/41, 31, 33, 36, 25, 71/43, 34; 210/638, 639, 787, 805; 423/167, 306

[56] References Cited

U.S. PATENT DOCUMENTS

| | | | |
|---|---|---|---|
| 3,135,595 | 6/1964 | Williams | 71/25 |
| 3,374,081 | 3/1968 | Miller | 71/11 |
| 4,007,030 | 2/1977 | Schroeder et al. | 71/43 X |
| 4,015,971 | 4/1977 | Barannik et al. | 71/31 |
| 4,069,033 | 1/1978 | Baldassari | 71/25 |
| 4,117,089 | 9/1978 | Fujita et al. | 423/306 |
| 4,176,057 | 11/1979 | Wheatley et al. | 210/639 X |
| 4,188,291 | 2/1980 | Anderson | 210/639 |
| 4,482,459 | 11/1984 | Shiver | 210/639 |

FOREIGN PATENT DOCUMENTS 596562  2/1978  U.S.S.R. ......................... 71/31

*Primary Examiner*—Ferris H. Lander
*Attorney, Agent, or Firm*—Killworth, Gottman Hagan & Schaeff

[57] ABSTRACT

A process is provided for the recovery of one or more useful products including fertilizer, salt, and/or purified process water from brines. The source of the brines can be oil field wastes, seawater, or other inland brine sources. Phosphoric acid is initially added to the brine followed by addition of ammonia or a basic form of potassium. The resulting precipitate is useful as a fertilizer. The remaining salt in the brine may then be removed and recovered along with purified process water.

14 Claims, 1 Drawing Figure

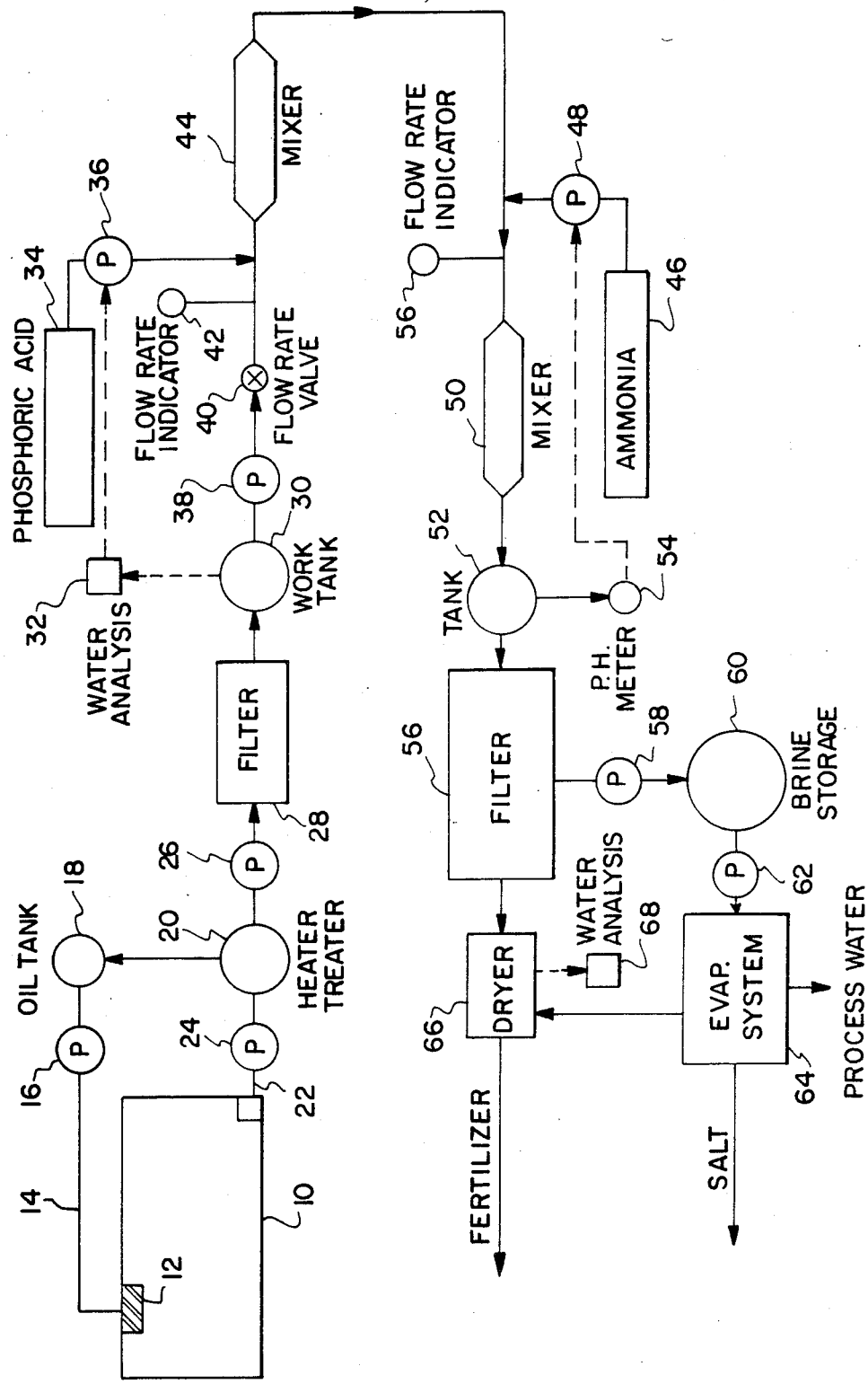

METHOD OF PROVIDING FERTILIZER FROM BRINES

BACKGROUND OF THE INVENTION

This invention relates to a process for converting brines into useful products, and more particularly to converting saline waters such as oil field brine wastes, seawater, or other inland saline waters into fertilizer, salt, and/or purified process water.

Oil field operations generate waste products in the production and handling of crude oil. These waste products include drilling mut pit waters and oil field brines. The quantities of brines produced in oil fields can be substantial, with brine fractions accounting for from 4 to 96 percent of the total liquid volume produced. Brines from other inland or seawater sources also present disposal problems.

Various methods of disposal of these brines have been attempted including solar evaporation, distillation, controlled release of brines into surface waters, and injection of brines into subterranean formations. However, in areas of high annual rainfall and/or high relative humidity, such as much of the midwestern and eastern portions of the United States, solar evaporation becomes impractical. Moreover, with increasing state and federal regulatory pressures, diversion of large volumes of brine into surface waters is not an environmentally acceptable solution.

While distillation as a means of recovering fresh water from these saline sources has been attempted, the presence in such brines of a large proportion of divalent metal chlorides such as calcium and magnesium chloride have greatly complicated recovery efforts. These metal chlorides are highly corrosive to process equipment surfaces and deposit hard to remove mineral scales. This scale deposition becomes an even greater problem when the brines are heated.

Presently, brine treatment using dissolved air flotation methods to remove suspended oil, followed by deep well injection of the brine is regarded by the United States Environmental Protection Agency as the best practicable technology for disposal. However, deep well injection is expensive, difficult to design to a given level of capacity, and requires careful conditioning of the brine prior to injection. Economies of scale favor deep well injection systems having capacities of millions of gallons of brines per month. However, in oil fields in the midwestern and eastern U.S. where less brine wastes are produced than in western oil fields, and where the oil fields themselves are smaller, deep well injection may not, in many instances, be an economically feasible disposal alternative.

Accordingly, the need exists for a cost effective and environmentally acceptable method for the disposal of oil field waste brines and other saline water sources.

SUMMARY OF THE INVENTION

The present invention provides for the recovery of valuable fertilizers from saline water sources such as oil field waste brines and seawater. Byproducts of the process of the present invention include salt (comprising principally sodium chloride) and purified process water. Both of these byproducts, as well as the recovered fertilizers, are useful materials having economic value.

The process of the present invention recovers a fertilizer by initially adding phosphoric acid to brine. This is followed by the addition of ammonia to the brine. After agitation, a relatively insoluble precipitate forms which has been found to be principally comprised of a mixture of divalent metal ammonium phosphates. These metal ammonium phosphates are superior fertilizers having desirable non-burning and slow release characteristics. Alternatively, instead of adding ammonia, potassium hydroxide or other source of basic potassium may be used to form a metal potassium phosphate fertilizer.

The remaining dissolved solids in the brine solution, which is now substantially free of divalent metal chloride compounds, can be readily separated and recovered through flash evaporation, distillation, or reverse osmosis techniques. These recovered solids are principally alkali metal chlorides (sodium, potassium, and/or lithium chlorides) with minor amounts of sulfates and silicates. These salts are useful for snow and ice control or can be sold to industries which require salt such as pharmaceutical manufacturers or food processors. The water which is then recovered is substantially free of dissolved solids and can be disposed of directly without further treatment or can be sold as processed water to industrial concerns.

Accordingly, it is an object of the present invention to provide a process for the recovery of one or more useful products including fertilizer, salt, and/or purified process water from brines. This and other objects and advantages of the invention will be apparent from the following detailed description, the accompanying drawing, and the appended claims.

BRIEF DESCRIPTION OF THE DRAWINGS

The single drawing FIGURE illustrates, in the form of a schematic diagram, the process of the present invention.

DESCRIPTION OF THE PREFERRED EMBODIMENTS

In accordance with the practice of the present invention, and with reference to the drawing FIGURE, a saline water source such as an oil field waste brine, seawater, or other inland saline water is initially stored in a large pit or storage chamber 10. The pit or storage chamber 10 is preferably lined or otherwise formed to be substantially water tight. If an oil field waste brine is used as the saline water source, it may be necessary to remove traces of oil which are present in the brine. Typically, there is approximately one-half pint of oil per barrel of brine as received from oil field operations. This oil removal is accomplished through the use of a surface skimmer 12 which collects oil floating on the surface of the brine and pumps it via line 14 and pump 16 to an oil storage tank 18.

Additionally, further oil may be removed from the brine in a separation device such as heater treater 20 after removal of the brine from pit 10 via line 22 and pump 24. Heater treater 20 typically comprises a holding tank or the like which provides undisturbed residence time for separation of the oil and brine. Heat is supplied to heater treater 20 to accelerate the separation process, and, optionally, chemicals may be added to heater treater 20 which further enhance separation.

The brine is then filtered to remove suspended solids by pumping it via pump 26 through filter 28. Filter 28 may be any suitable filtration device and is preferably a cartridge-type filter having a nominal pore diameter of approximately 45 microns. Such cartridge-type filters are commercially available from a number of manufacturers.

After filtration, the brine is sent to a work tank 30 which serves as a holding tank for the brine prior to reaction with phosphoric acid and ammonia. The brine in work tank 30 is periodically sampled at water analysis station 32 to determine the concentrations of divalent metal cations contained therein. This analysis is then utilized to meter the proper amount of phosphoric acid into the brine from phosphoric acid source 34 and metering pump 36. Preferably, the amount of phosphoric acid added is in a stoichiometric ratio to the concentration of divalent metal cations in the brine, resulting in a chemical reaction which causes substantially all of the divalent metal cations in the brine to be removed as a precipitate as more fully explained below. The flow rate of the brine is controlled by pump 38 and flow rate valve 40 and is monitored periodically by flow rate indicator 42.

A preferred source of phosphoric acid is agricultural grade phosphoric acid containing 75% orthophosphoric acid (54% when reported as phosphorus pentoxide). The brine and phosphoric acid are thoroughly agitated in mixer 44 to form a reaction mixture. While any suitable agitation device may be utilized, it is preferred that the reactants be mixed in a motionless mixing device. Such devices are available from Chemineer-Kenics, Dayton, Ohio, and Komax Systems, Inc., Long Beach, Calif., among others.

After mixing, ammonia is added to the phosphoric acid-brine reaction mixture from ammonia source 46 via metering pump 48. A preferred source of ammonia is 29% aqueous ammonia in the form of ammonium hydroxide, although other sources of ammonia, such as gaseous ammonia, may be used. The ammonia is added in a controlled manner to bring the pH value of the brine to between about 4.5 and 6.0, preferably about 4.8. This corresponds to an approximately stoichiometric amount of ammonia. This controlled addition of base also limits the temperature rise in the brine which results from the exothermic reaction which occurs.

The reactants are again thoroughly agitated in mixer 50 and passed to a holding tank 52. Mixer 50 may be a motionless mixer of the type previously identified or may be any suitable agitation device. The precipitate which forms is a mixture of hydrated metal ammonium phosphates which are believed to have the formula:

$$M^{+2}(NH_4)PO_4 \cdot 5H_2O,$$

where $M^{+2}$ is a divalent metal cation such as calcium, magnesium, strontium, iron, zinc, or manganese. The principal divalent cations present in most brines are calcium and magnesium.

The pH of the solution in holding tank 52 is measured by pH meter 54. This measurement, in turn, is used to control the correct amount of ammonia added upstream through metering pump 48. The rate of flow of the brine is periodically monitored using flow rate indicator 56 and is adjusted if necessary.

Alternatively, instead of ammonia being added to the phosphoric acid-brine mixture, a source of potassium in basic form such as potassium hydroxide may be added and mixed through meter pump 48 and mixer 50. Again, a precipitate forms which is a mixture of metal potassium phosphates. In this embodiment of the invention, potassium in basic form is added to bring the pH of the brine in holding tank 52 to between about 6.0 and 7.0, and preferably about 6.5.

From holding tank 52 the brine and precipitate are passed to filtration station 56 where the precipitate is dewatered and washed to remove salt. The filtering device may be a continuous belt or drum-type filter which operates by positioning the precipitate or a moving porous medium and applying a vacuum to it to dewater the precipitate. However, any filtration device which can accomplish separation of the precipitate from the brine solution can be utilized.

Washing of the precipitate at filtration station 56 removes any alkali metal chlorides present in the precipitate. This washing reduces the chloride content of the precipitate, or filter cake as it is sometimes termed, to less than about 0.5% by weight.

The brine (filtrate) stream from filtration station 56 is then pumped via pump 58 to storage tank 60. The brine is further neutralized to a pH of 7.0 in storage tank 50 by the addition of a suitable base such as sodium hydroxide. The neutral brine stream is then fed via pump 62 to a flash evaporator 64. There, under reduced pressure and with the application of heat, salt and distilled water are recovered. Alternatively, a reverse osmosis process may be used to separate the salt and water.

The recovered salt is principally a mixture of alkali metal chlorides with minor amounts of other halides, sulfates, and silicates. The recovered salt is useful for snow and ice control on roads and as an additive or processing agent for pharmaceuticals manufacturers, food processing plants, and the like. The recovered water contains less than 1 mg/l of total solids and has an absence of common anions such as chlorides or sulfates as well as an absence of divalent metal cations. The water can be directly discharged to rivers, lakes, and streams with no environmental harm. Alternatively, the recovered water is useful for those industries having large process water requirements.

The filter cake recovered from filtration station 56 is sent to a suitable drying apparatus 66 such as a rotary dryer. There it is dried to an acceptable moisture content which can be monitored by water analysis station 68. The water of hydration in the filter cake need not be removed by drying. It has been found that economical drying can be effected by utilizing the waste heat generated in evaporator 64 which can be supplied through line 70 to dryer 66.

The dried filter cake is usable directly as an agricultural fertilizer or can be blended with other products to yield a fertilizer or nitrogen, phosphorus, and potassium (NPK) content. When ammonia is used in the process of the present invention, a fertilizer having an NPK value of 8-40-0 is obtained. In an alternative embodiment, when a basic source of potassium is utilized, the resultant fertilizer has an NPK value of 0-40-8.

In order that the invention may be more fully understood, reference is now made to the following non-limiting examples.

EXAMPLE 1

A sample of brine that had been produced from the Clinton Sand on the Felumlee Lease in Licking County, Hanover Township, Ohio, was taken from a brine storage tank. This brine had the following composition and properties:

| | |
|---|---|
| Total Dissolved Solids | 262,100 Mg/L |

-continued

| | |
|---|---|
| Specific Gravity at 20° C. | 1.177 |
| pH | 5.80 |
| Calcium | 37,200 Mg/L |
| Magnesium | 5,090 Mg/L |
| Strontium | 1,000 Mg/L |
| Manganese | 33 Mg/L |
| Sodium | 52,300 Mg/L |
| Potassium | 910 Mg/L |
| Lithium | 22 Mg/L |
| Iron | 220 Mg/L |
| Zinc | 1.3 Mg/L |
| Chloride | 154,000 Mg/L |
| Bromide | 1,670 Mg/L |
| Iodide | 31 Mg/L |
| Sulfate | 524 Mg/L |
| Bicarbonate | 23 Mg/L |
| Silica | 18 Mg/L |

A sample of this water was filtered through medium speed, qualitative paper to remove any dissolved solids. It was then filtered a second time through cotton to remove any suspended oil. The clear brine was then treated as follows:

To a measured volume of 100 ml of the filtered brine, 14.1 grams of agricultural grade phosphoric acid was added. This acid contained 75% orthophosphoric acid (54% phosphorus pentoxide). The mixture was stirred to insure good mixing; then, 28% ammonium hydroxide was added slowly with good stirring, and at such a rate as to prevent the reaction from going above 75° C., until a pH of 4.8 was attained. The reaction mixture was allowed to sit for a period of 10 minutes and the pH was then remeasured to insure that the value read was stable.

The heavy precipitate formed by the neutralizaton step was then filtered through a number one grade paper in a Buchner funnel attached to a vacuum filter flask. Both the filtrate and the precipitate were saved for further treatment.

The precipitate was then washed with water until the wash water remained clear when added to silver nitrate solution. It was then dried in an oven at approximately 100° C. to a constant weight loss. The final weight of the powder was 27.86 grams. Analysis for phosphorous showed it contained 40.38% as phosphate. The filtrate showed less than 0.1% phosphate. Analysis for nitrogen showed that the dried precipitate contained 5.75% and that the filtrate contained 0.04%.

The filtrate was then neutralized with sodium hydroxide to pH 7.0, a process that required 8.3 grams of the base. The solution was then evaporated in a Rotavapor (Rotating, Vapor, Continuous Evaporator) device. The salt recovered was dried overnight in an oven at 105° C. Upon cooling it was found to weigh 25.74 grams.

The water recovered from the evaporation step contained less than one mg/l of total solids. It showed none of the common ions anions such as sulfate or chloride when tested by chemical means. There were no multivalent ions present. From the 100 ml sample, 91.05 grams were recovered.

The yields can be summarized as follows:

| Recovered | Theoretical | Actual | Percent |
|---|---|---|---|
| Fertilizer | 28.04 | 27.86 | 99.36 |
| Salt | 25.74 | 25.53 | 99.55 |
| Water | 92.16 | 91.05 | 98.80 |

An analysis of the recovered salt showed it to have the following approximate composition:

| | |
|---|---|
| Sodium Chloride | 97.02% |
| Potassium Chloride | 1.31% |
| Sodium Bromide | 1.63% |
| Sodium Iodide | 0.01% |
| Other Salts | 0.03% |

EXAMPLE 2

A sample of brine that had been produced from the Clinton Sand on the Conrad Lease in Knox County, Union Township, Ohio, was taken from a brine storage tank. This brine had the following composition and properties:

| | |
|---|---|
| Total Dissolved Solids | 343,400 Mg/L |
| Specific Gravity at 20° C. | 1.221 |
| pH | 5.58 |
| Calcium | 43,300 Mg/L |
| Magnesium | 7,160 Mg/L |
| Strontium | 1,290 Mg/L |
| Manganese | 3 Mg/L |
| Sodium | 66,100 Mg/L |
| Potassium | 1,210 Mg/L |
| Lithium | 25 Mg/L |
| Iron | 211 Mg/L |
| Zinc | 1.8 Mg/L |
| Chloride | 202,000 Mg/L |
| Bromide | 1,470 Mg/L |
| Iodide | 32 Mg/L |
| Sulfate | 570 Mg/L |
| Bicarbonate | 28 Mg/L |
| Silica | 19 Mg/L |

A sample of this water was filtered through medium speed, qualitative paper to remove any dissolved solids. It was then filtered a second time through cotton to remove any suspended oil. The clear brine was then treated as follows:

To a measured volume of 100 ml of the filtered brine, 17.1 grams of agricultural grade phosphoric acid was added. The mixture was stirred to insure good mixing; then, 28% ammonium hydroxide was added slowly with good stirring, and at such a rate as to prevent the reaction from going above 75° C., until a pH of 4.8 was attained. The reaction mixture was allowed to sit for a period of 10 minutes and the pH was then remeasured to insure that the value read was stable.

The heavy precipitate formed by the neutralization step was then filtered through a number one grade paper in a Buchner funnel attached to a vacuum filter flask. Both the filtrate and the precipitate were saved for further treatment.

The precipitate was then washed with water until the wash water remained clear when added to silver nitrate solution. It was then dried in an oven at approximately 100° C. to a constant weight loss. The final weight of the powder was 27.86 grams. Analysis for phosphorous showed it contained 40.88% as phosphate. The filtrate showed less than 0.1% phosphate. Analysis for nitrogen showed that the dried precipitate contained 5.80% and that the filtrate contained 0.04%.

The filtrate was then neutralized with sodium hydroxide to pH 7.0, a process that required 11.2 grams of the base. The solution was then evaporated in a Rotavapor device. The salt recovered was dried overnight in an oven at 105° C. Upon cooling it was found to weigh 33.23 grams.

The water recovered from the evaporation step contained less than one mg/l of total solids. It showed none of the common ions anions such as sulfate or chloride when tested by chemical means. There were no multivalent ions present. From the 100 ml sample, 88.26 grams were recovered.

The yields can be summarized as follows:

| Recovered | Theoretical | Actual | Percent |
|---|---|---|---|
| Fertilizer | 33.88 | 33.76 | 99.65 |
| Salt | 33.43 | 33.23 | 99.40 |
| Water | 88.66 | 88.26 | 99.55 |

An analysis of the recovered salt showed it to have the following approximate composition:

| | |
|---|---|
| Sodium Chloride | 92.92% |
| Potassium Chloride | 0.31% |
| Sodium Bromide | 0.96% |
| Sodium Iodide | 0.01% |
| Other Salts | 0.80% |

EXAMPLE 3

A sample of brine that had been produced from the Clinton Sand on the Conrad Lease in Knox County, Union Township, Ohio, was taken from a brine storage tank. This brine had the following composition and properties:

| | |
|---|---|
| Total Dissolved Solids | 251,600 Mg/L |
| Specific Gravity at 20° C. | 1.167 |
| pH | 5.11 |
| Calcium | 31,900 Mg/L |
| Magnesium | 4,280 Mg/L |
| Strontium | 900 Mg/L |
| Manganese | 33 Mg/L |
| Sodium | 53,800 Mg/L |
| Potassium | 1,050 Mg/L |
| Lithium | 21 Mg/L |
| Iron | 179 Mg/L |
| Zinc | 5.5 Mg/L |
| Chloride | 149,000 Mg/L |
| Bromide | 1,700 Mg/L |
| Iodide | 8.2 Mg/L |
| Sulfate | 570 Mg/L |
| Bicarbonate | 15 Mg/L |
| Silica | 18 Mg/L |

A sample of this water was filtered through medium speed, qualitative paper to remove any dissolved solids. It was then filtered a second time through cotton to remove any suspended oil. The clear brine was then treated as follows:

To a measured volume of 100 ml of the filtered brine 12.0 grams of agricultural grade phosphoric acid was added. The mixture was stirred to insure good mixing, then 28% ammonium hydroxide was added slowly with good stirring, and at such a rate as to prevent the reaction from going above 75° C., until a pH of 4.8 was attained. The reaction mixture was allowed to sit for a period of 10 minutes and the pH was then remeasured to insure that the value read was stable.

The heavy precipitate formed by the neutralization step was then filtered through a number one grade paper in a Buchner funnel attached to a vacuum filter flask. Both the filtrate and the precipitate were saved for further treatment.

The precipitate was then washed with water until the wash water remained clear when added to silver nitrate solution. It was then dried in an oven at approximately 100° C. to a constant weight loss. The final weight of the powder was 23.88 grams. Analysis for phosphorous showed it contained 40.68% as phosphate. The filtrate showed less than 0.1% phosphate. Analysis for nitrogen showed that the dried precipitate contained 5.84% and that the filtrate contained 0.06%.

The filtrate was then neutralized with sodium hydroxide to pH 7.0, a process that required 7.42 grams of the base. The solution was then evaporated in a Rotavapor device. The salt recovered was dried overnight in an oven at 105° C. Upon cooling it was found to weight 24.48 grams.

The water recovered from the evaporation step contained less than one mg/l of total solids. It showed none of the common ions anions such as sulfate or chloride when tested by chemical means. There were no multivalent ions present. From the 100 ml sample, 90.88 grams were recovered.

The yields can be summarized as follows:

| Recovered | Theoretical | Actual | Percent |
|---|---|---|---|
| Fertilizer | 23.97 | 23.88 | 99.62 |
| Salt | 24.71 | 24.48 | 99.07 |
| Water | 91.99 | 90.88 | 98.79 |

An analysis of the recovered salt showed it to have the following approximate composition:

| | |
|---|---|
| Sodium Chloride | 97.04% |
| Potassium Chloride | 1.36% |
| Sodium Bromide | 0.76% |
| Sodium Iodide | 0.01% |
| Other Salts | 0.83% |

EXAMPLE 4

A sample of brine that had been produced from the Clinton Sand on the Goodlive Lease in Perry County, Monday Creek Township, Ohio, was taken from a brine storage tank. This brine had the following composition and properties:

| | |
|---|---|
| Total Dissolved Solids | 341,000 Mg/L |
| Specific Gravity at 20° C. | 1.229 |
| pH | 4.99 |
| Calcium | 49,300 Mg/L |
| Magnesium | 8,800 Mg/L |
| Strontium | 1,020 Mg/L |
| Manganese | 18 Mg/L |
| Sodium | 64,800 Mg/L |
| Potassium | 1,120 Mg/L |
| Lithium | 25 Mg/L |
| Iron | 166 Mg/L |
| Zinc | 7.7 Mg/L |
| Chloride | 204,000 Mg/L |
| Bromide | 2,210 Mg/L |
| Iodide | 9.6 Mg/L |
| Sulfate | 534 Mg/L |
| Bicarbonate | 11 Mg/L |
| Silica | 8 Mg/L |

A sample of this water was filtered through medium speed, qualitative paper to remove any dissolved solids. It was then filtered a second time through cotton to remove any suspended oil. The clear brine was then treated as follows:

To a measured volume of 100 ml of the filtered brine 19.6 grams of agricultural grade phosphoric acid was added. The mixture was stirred to insure good mixing, then 28% ammonium hydroxide was added slowly with good stirring, and at such a rate as to prevent the reaction from going above 75° C., until a pH of 4.8 was attained. The reaction mixture was allowed to sit for a period of 10 minutes and the pH was then remeasured to insure that the value read was stable.

The heavy precipitate formed by the neutralization step was then filtered through a number one grade paper in a Buchner funnel attached to a vacuum filter flask. Both the filtrate and the precipitate were saved for further treatment.

The precipitate was then washed with water until the wash water remained clear when added to silver nitrate solution. It was then dried in an oven at approximately 100° C. to a constant weight loss. The final weight of the powder was 38.78 grams. Analysis for phosphorous showed it contained 41.08% as phosphate. The filtrate showed less than 0.1% phosphate. Analysis for nitrogen showed that the dried precipitate contained 5.94% and that the filtrate contained 0.06%.

The filtrate was then neutralized with sodium hydroxide to pH 7.0, a process that required 11.7 grams of the base. The solution was then evaporated in a Rotavapor device. The salt recovered was dried overnight in an oven at 105° C. Upon cooling it was found to weigh 32.79 grams.

The water recovered from the evaporation step contained less than one mg/l of total solids. It showed none of the common ions anions such as sulfate or chloride when tested by chemical means. There were no multivalent ions present. From the 100 ml sample, 88.30 grams were recovered.

The yields can be summarized as follows:

| Recovered | Theoretical | Actual | Percent |
|---|---|---|---|
| Fertilizer | 39.06 | 37.78 | 96.72 |
| Salt | 33.81 | 32.79 | 96.98 |
| Water | 89.09 | 88.30 | 99.11 |

An analysis of the recovered salt showed it to have the following approximate composition:

| Sodium Chloride | 97.98% |
|---|---|
| Potassium Chloride | 1.66% |
| Sodium Bromide | 0.30% |
| Sodium Iodide | 0.01% |
| Other Salts | 0.05% |

EXAMPLE 5

A sample of brine that had been produced from the Clinton Sand on the Evans Lease in Hocking County, Ward Township, Ohio, was taken from a brine storage tank. This brine had the following composition and properties:

| Total Dissolved Solids | 298,000 Mg/L |
|---|---|
| Specific Gravity at 20° C. | 1.201 |
| pH | 5.20 |
| Calcium | 60,100 Mg/L |
| Magnesium | 8,040 Mg/L |
| Strontium | 1,100 Mg/L |
| Manganese | 1 Mg/L |
| Sodium | 60,100 Mg/L |
| Potassium | 1,660 Mg/L |
| Lithium | 31 Mg/L |
| Iron | 34 Mg/L |
| Zinc | 1.1 Mg/L |
| Chloride | 183,000 Mg/L |
| Bromide | 1,800 Mg/L |
| Iodide | 14 Mg/L |
| Sulfate | 345 Mg/L |
| Bicarbonate | 16 Mg/L |
| Silica | 11 Mg/L |

A sample of this water was filtered through medium speed, qualitative paper to remove any dissolved solids. It was then filtered a second time through cotton to remove any suspended oil. The clear brine was then treated as follows:

To a measured volume of 100 ml of the filtered brine 16.3 grams of agricultural grade phosphoric acid was added. The mixture was stirred to insure good mixing, then 28% ammonium hydroxide was added slowly with good stirring, and at such a rate as to prevent the reaction from going above 75° C., until a pH of 4.8 was attained. The reaction mixture was allowed to sit for a period of 10 minutes and the pH was then remeasured to insure that the value read was stable.

The heavy precipitate formed by the neutralization step was then filtered through a number one grade paper in a Buchner funnel attached to a vacuum filter flask. Both the filtrate and the precipitate were saved for further treatment.

The precipitate was then washed with water until the wash water remained clear when added to silver nitrate solution. It was then dried in an oven at approximately 100° C. to a constant weight loss. The final weight of the powder was 31.62 grams. Analysis for phosphorous showed it contained 40.88% as phosphate. The filtrate showed less than 0.1% phosphate. Analysis for nitrogen showed that the dried precipitate contained 5.97% and that the filtrate contained 0.06%.

The filtrate was then neutralized with sodium hydroxide to pH 7.0, a process that required 10.0 grams of the base. The solution was then evaporated in a Rotavapor device. The salt recovered was dried overnight in an oven at 105° C. Upon cooling it was found to weigh 29.89 grams.

The water recovered from the evaporation step contained less than one mg/l of total solids. It showed none of the common ions anions such as sulfate or chloride when tested by chemical means. There were no multivalent ions present. From the 100 ml sample, 88.70 grams were recovered.

The yields can be summarized as follows:

| Recovered | Theoretical | Actual | Percent |
|---|---|---|---|
| Fertilizer | 32.44 | 31.62 | 97.47 |
| Salt | 30.10 | 29.89 | 99.30 |
| Water | 89.70 | 88.70 | 98.89 |

An analysis of the recovered salt showed it to have the following approximate composition:

| Sodium Chloride | 96.90% |
|---|---|
| Potassium Chloride | 0.96% |
| Sodium Bromide | 0.52% |
| Sodium Iodide | 0.01% |

| | |
|---|---|
| -continued | |
| Other Salts | 0.61% |

EXAMPLE 6

A series of experiments were run to show the fate of the phosphorous component of the fertilizer produced by the process of the present invention in the soil. In these experiments a magnesium ammonium phosphate pentahydrate was prepared. This material was analyzed and found to have the following composition:

| | |
|---|---|
| Magnesium | 10.65% |
| Nitrogen | 7.90% |
| Phosphate | 41.93% |
| Water | 39.42% |

Six test plots located near Dallas, Texas, three feet square which were separated by fallow plots of the same size were prepared by turning the soil to a depth of 18 inches. Two of the test plots were not fertilized at all. Two received a commercial 5-10-5 fertilizer of a type recommended by the local county agent for truck crops. The remaining two plots were treated with the magnesium ammonium phosphate by spreading the material on the surface after planting seeds in the soil. The commercial fertilizer was worked into the soil, because if it were placed on top the tender shoots of the germinating seeds would burn and die upon contact with it. The magnesium ammonium phosphate was applied in layers on top of the soil. The seeds germinated, and the shoots of the plants grew through the accumulation of the magnesium ammonium phosphate fertilizer with no apparent damage.

In the test plots, a collection of onions, radishes, cabbages, tomatoes, carrots, and egg plants were placed in such a way that each test plot had a duplicate that was not treated, one that received commercial fertilizer, and one that received the metal ammonium phosphate.

Analysis of the soil to determine the nitrogen, phosphorus and magnesium ratio was made on the plots that were treated with the metal ammonium phosphate. The initial ratio of nitrogen to magnesium to phosphate was 1.00:1.34:5.31.

In two years of growing truck crops on the test plots, the ratio of the elements did not change in the plots that were treated with the magnesium ammonium phosphate. After two years with no additional addition of nutrient to the soil, a ratio of 1.00:1.33:5.30 still existed; although the amount of the elements present was reduced by about 70%.

Initially, the same amount of phosphate was applied to each of the plots using the commercial fertilizer in one case and the magnesium ammonium phosphate in the other. After one year during which crops were grown on the soil for approximately eight months and it lay fallow for the other four, the phosphate detectable in the plots treated with the commercial fertilizer had been reduced by 92%. The metal ammonium phosphate still showed 55% of the original amount of this nutrient still in the soil. None of the plots was refertilized the second year.

The nutrients were clearly reflected by the plants that grow on the plots. The untreated plots showed an early purple-red appearance in radish leaves, indicating a phosphate deficiency. The radishes did not mature enough for table use before they were killed by the hot weather. Onions grew to useable size, but they demonstrated some stunting, and there were some cases of mottled yellow and brown leaves. Leafy crops such as cabbage showed some reddish-purplish cast during the first year, and a severe coloring in the second year. Tomatoes did not produce on these plots.

The plots treated with commercial fertilizer did well during the first year. The tomatoes refused to set fruit for the first month of the season. Flowers would form, but drop off. Fruit finally set in early July and the crop made quite well through early December when it was killed by a freeze.

The second year the plot which had been treated with commercial fertilizer did not do so well. It became obvious early that the fertilizer application had been spent. The radishes did not do well, the egg plants that had done well the previous year refused to set fruit, and the tomato yield amounted to only eleven medium size fruits from six plants.

The plots treated with the magnesium ammonium phosphate produced tomatoes by mid May the first year, and by the end of the first week in May the second year. In all cases these plants were grown in hot boxes, and transferred to the outside plots in late February. The production of the tomatoes from these plots were equal to or better than those from the plots treated with commercial fertilizer. The second year the crop was equal to the first.

While the methods herein described constitute preferred embodiments of this invention, it is to be understood that the invention is not limited to these precise methods and that changes may be made without departing from the scope of the invention, which is defined in the appended claims.

What is claimed is:

1. A method for recovering a fertilizer from a brine containing divalent metal cations comprising the steps of:
    (a) first adding phosphoric acid to said brine and agitating said phosphoric acid and said brine to form a mixture;
    (b) then adding ammonia to said mixture to adjust the pH of said mixture to between 4.5 and 6.0 and agitating said mixture to precipitate substantially all of the divalent metal cations contained in said mixture, the precipitate comprising divalent metal ammonium phosphates which are useful as a fertilizer; and
    (c) separating said precipitate from said mixture.

2. The method of claim 1 in which said phosphoric acid and said ammonia are added in substantially stoicheometric ratios to the amount of divalent metal cations contained in said brine.

3. The method of claim 1 in which said brine is an oil field waste brine.

4. The method of claim 1 in which said brine is seawater.

5. The method of claim 1 further including the steps of evaporating the remaining liquid from step (c) and recovering salt therefrom.

6. The method of claim 1 further including the steps of treating the remaining liquid from step (c) using reverse osmosis and recovering salt and purified water therefrom.

7. The method of claim 1 in which the pH of the mixture in step (b) is adjusted to 4.8.

8. A method for recovering a fertilizer from a brine containing divalent metal cations comprising the steps of:
   (a) first adding phosphoric acid to said brine and agitating said phosphoric acid to form a mixture;
   (b) then adding potassium hydroxide to said mixture to adjust the pH of said mixture to between 6.0 and 7.0 and agitating said mixture to precipitate substantially all of the divalent metal cations contained in the mixture, the precipitate comprising potassium divalent metal phosphates which are useful as a fertilizer; and
   (c) separating said precipitate from said mixture.

9. The method of claim 8 in which said potassium hydroxide and said phosphoric acid are added in substantially stoicheometric ratios to the amount of divalent metal cations contained in said brine.

10. The method of claim 8 in which said brine is an oil field waste brine.

11. The method of claim 8 in which said brine is seawater.

12. The method of claim 8 further including the steps of evaporating the remaining liquid from step (c) and recovering salt therefrom.

13. The method of claim 8 further including the steps of treating the remaining liquid from step (c) using reverse osmosis and recovering salt and purified water therefrom.

14. The method of claim 8 in which the pH of the mixture in step (b) is adjusted to 6.5.

* * * * *